May 28, 1929.   K. MIDDELBOÉ   1,714,515
INDICATING THE LEVEL OF PULVERULENT MATERIALS

Filed April 12, 1928

INVENTOR
Kristian Middelboé
BY
Redding, Greeley, O'Shea & Campbell
ATTORNEYS

Patented May 28, 1929.

1,714,515

UNITED STATES PATENT OFFICE.

KRISTIAN MIDDELBOE, OF FREDERIKSBERG, NEAR COPENHAGEN, DENMARK, ASSIGNOR TO F. L. SMIDTH & CO., OF NEW YORK, N. Y., A CORPORATION OF NEW JERSEY.

INDICATING THE LEVEL OF PULVERULENT MATERIALS.

Application filed April 12, 1928, Serial No. 269,593, and in Great Britain December 3, 1927.

In the handling of pulverulent material, such as cement, for example, it is oftentimes desirable to indicate the level of such material in a bin or other container, either solely for observation or as well for the regulation of the movement of the material into or out of the container. If a body of less specific gravity than the material is supported upon the material it has been found that the indication as to the level of the material is unreliable because such body or float does not respond quickly to changes in level and may even become completely buried in the material without change of level. In the attempt to overcome this difficulty and to provide a reliable means of indicating the level of such material it has been found that the float, as it may be called for convenience, is quickly responsive to changes in level if there is imparted to the material in the immediate vicinity of the float a condition of fluidity. This is most conveniently accomplished by agitation of the material about the float as, for example, by a mechanical agitating means which may be independent of the float or a means for imparting such movement to the float itself that the material will be agitated or have imparted to it a condition of fluidity. Thus, for example, the means for agitating may be means for causing the float to rotate about its own axis while permitting it to rise or fall with the level of the material, or a device external to the float so actuated as to agitate the material about the float while being free to rise and fall with the float.

The invention will be more fully explained hereinafter with reference to the accompanying drawing in which are illustrated several embodiments of the invention or with which the invention may be practiced.

In the drawing—

In the several figures of the drawings the bin or other container for the material, the level of which is to be indicated, is represented at 1, the material itself being represented at 2. It will be understood that the container may be of any suitable character and that the variations of level of the material in the container may be due either to the inflow or the outflow of material into or from the container.

Figure 1:
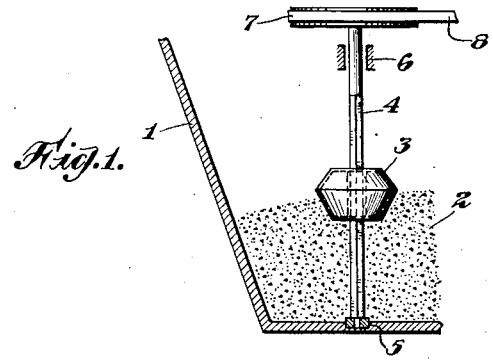
Figure 1 is a somewhat diagrammatical view, partly in vertical section and partly in elevation, of an indicating means in which a float is rotated about a vertical axis while being free to rise and fall with the level of the material in the container.

In the embodiment of the invention illustrated in Figure 1 a body of less specific gravity than the material itself, for convenience termed a float, which is to be supported upon the material and is to indicate the level of the material, is represented at 3 as a hollow body of metal or other suitable material which is engaged for rotation by a shaft 4 supported in suitable bearings 5, 6, and having a pulley 7 to receive a belt 8, the float 3 being free to move vertically with respect to the shaft 4 while being rotated therewith. The rotation of the float, while it is supported by the material, agitates or imparts a condition of fluidity to the material and thereby enables the float to be free from adhesion of the material and to rise and fall freely with changes in level of the material.

Figure 2:
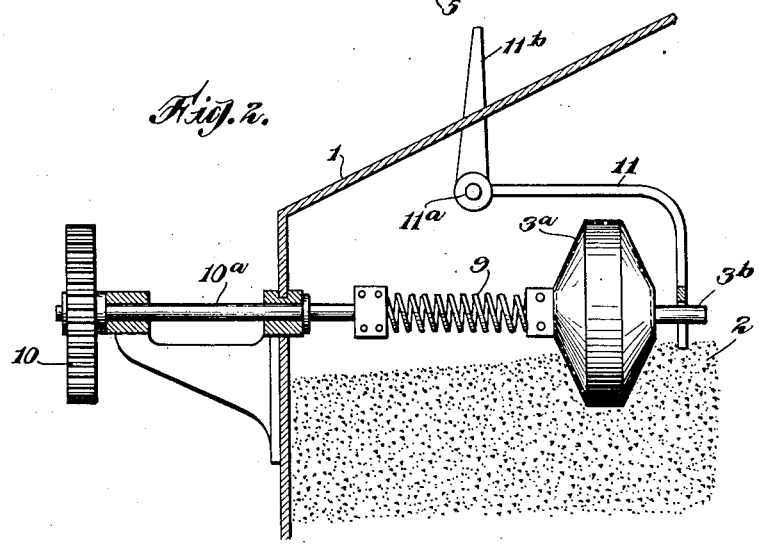
Figure 2 is a similar view of an indicating means in which the float is rotated about a horizontal axis while being free to rise and fall with the level of the material.

In the embodiment of the invention illustrated in Figure 2 the float $3^a$ is adapted to be rotated upon a horizontal axis, being connected, in the construction shown, by a flexible shaft 9 with a shaft $10^a$ which may be rotated by a pulley or gear 10. The float $3^a$ is thus free to rise and fall with the material upon which it is supported while at the same time the rotation of the float accomplishes the desired agitation of the material which permits the float to be freed from the material and to rise and fall with the level of the material. In the construction shown the spindle $3^b$ of the float engages a lever 11 pivoted at $11^a$ and operatively connected with an arm $11^b$ which may be simply an indicator or an element by which the flow of the material to or from the container 1 may be controlled.

Figure 3:
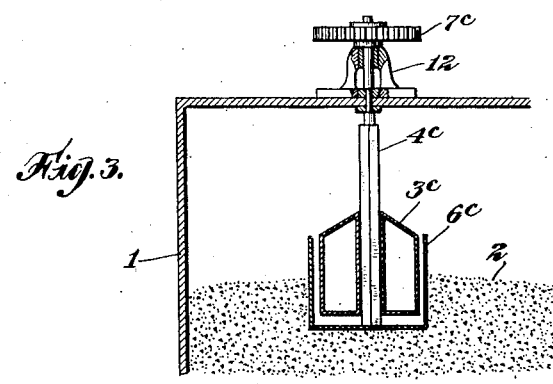
Figure 3 is a somewhat similar view of an indicating means in which the float is free to rise and fall while the material is agitated by a device external to the float.

In the embodiment of the invention illustrated in Figure 3, the float $3^c$ is free to rise and fall with the variations in level with the material 2 being guided in its movement by a shaft $4^c$ which carries at its lower end arms 6ᶜ outside of the float 3ᶜ. The shaft 4ᶜ is supported by a suitable bearing 12 and at its upper end receives a pulley or gear 7ᶜ by which the shaft and the arms are rotated so as to agitate or impart a condition of fluidity to the material 2 such that the float is freed from adhesion of the material and is free to rise and fall.

It will be understood that the invention may be practiced in different ways and by the aid of different devices, the essential being that the material shall have imparted to it a condition of fluidity which permits the float to clear itself from adhesion of the material and therefore free to respond to changes in the level of the material.

I claim as my invention:

1. The improvement in the method of indicating the level of pulverulent material by a body of less specific gravity than the material which consists in permitting the body to be supported by the material and imparting to the material a condition of fluidity.

2. The improvement in the method of indicating the level of pulverulent material by a body of less specific gravity than the material which consists in permitting the body to be supported by the material and agitating the material in the vicinity of the body.

3. In an apparatus for indicating the level of pulverulent material, the combination of a float to be supported by the material, and means to impart to the material in the vicinity of the float a condition of fluidity.

4. In an apparatus for indicating the level of pulverulent material, the combination of a float to be supported by the material, and means to agitate the material in the vicinity of the float to permit the float to clear itself of the material.

5. In an apparatus for indicating the level of pulverulent material, the combination of a float to be supported by the material, and means to rotate the float upon its own axis and thereby impart to the material a condition of fluidity and enable the float to clear itself of the material and to rise and fall with the changes in level of the material.

This specification signed this 24th day of March, A. D. 1928.

KRISTIAN MIDDELBOE.